US008727886B2

(12) United States Patent
McTernan et al.

(10) Patent No.: US 8,727,886 B2
(45) Date of Patent: May 20, 2014

(54) SYSTEM FOR DIRECT REMOTE ACCESS TO MONEY-OPERATED AMUSEMENT DEVICE

(75) Inventors: Brennan McTernan, Fanwood, NJ (US); Greg Nyce, Warrington, PA (US); Matthew Mawson, Mount Laurel, NJ (US)

(73) Assignee: AMI Entertainment Network, LLC, Wilmington, DE (US)

( * ) Notice: Subject to any disclaimer, the term of this patent is extended or adjusted under 35 U.S.C. 154(b) by 124 days.

(21) Appl. No.: 13/018,890

(22) Filed: Feb. 1, 2011

(65) Prior Publication Data
US 2011/0190051 A1 Aug. 4, 2011

Related U.S. Application Data

(60) Provisional application No. 61/300,264, filed on Feb. 1, 2010.

(51) Int. Cl.
*G07F 17/32* (2006.01)
(52) U.S. Cl.
CPC ............ *G07F 17/32* (2013.01); *G07F 17/3227* (2013.01); *G07F 17/3232* (2013.01); *G07F 17/3234* (2013.01)
USPC ........................................................ 463/42
(58) Field of Classification Search
CPC .. G07F 17/32; G07F 17/3232; G07F 17/3234
USPC ........................................................ 463/42
See application file for complete search history.

(56) References Cited

U.S. PATENT DOCUMENTS

| | | | |
|---|---|---|---|
| 4,998,240 A | * | 3/1991 | Williams ...................... 370/251 |
| 5,445,295 A | | 8/1995 | Brown |
| 5,769,269 A | | 6/1998 | Peters |
| 5,844,808 A | | 12/1998 | Konsmo et al. |

(Continued)

FOREIGN PATENT DOCUMENTS

WO 2009001075 A1 12/2008

OTHER PUBLICATIONS

Definition of chat server, http://www.computerhope.com/jargon/c/chatserv.htm.*
"AMI Publishes 2010 Software Upgrade for Ion Consoles on MegaNet", Vending Times; Issue Date: vol. 49, No. 11, Nov. 2009, Posted on: Nov. 9, 2009; Available at <http://www.vendingtimes.com/ME2/dirmod.asp?sid=EB79A487112B48A296B38C81345C8C7F&nm=Vending+Features&type=Publishing&mod=Publications%3A%3AArticle&mid=8F3A7027421841978F18BE895F87F791&tier=4&id=07B9DDC8024E419BA967246D153FA053>.

*Primary Examiner* — Corbett B Coburn
(74) *Attorney, Agent, or Firm* — Panitch Schwarze Belisario & Nadel LLP

(57) ABSTRACT

An amusement device communication system for direct remote access to money-operated amusement device includes an amusement device, an internet-based server, and a remote computer device. The amusement device has a memory, a display and a controller. The controller is operatively coupled to the memory, the input device and the display. The memory stores at least one electronic game and a system control program. The controller controls the display based upon the system control program retrieved from the memory and based upon inputs from the input device. The internet-based server is in communication with the amusement device through the internet. The remote computer device is configured to access the amusement device through a secured-communication connection through the internet-based server to allow access and control of the amusement device by the remote computer device.

12 Claims, 7 Drawing Sheets

(56) References Cited

U.S. PATENT DOCUMENTS

| | | | |
|---|---|---|---|
| 2002/0071557 A1* | 6/2002 | Nguyen | 380/251 |
| 2003/0088538 A1 | 5/2003 | Ballard | |
| 2004/0158871 A1 | 8/2004 | Jacobson | |
| 2005/0193209 A1* | 9/2005 | Saunders et al. | 713/182 |
| 2006/0059530 A1 | 3/2006 | Spielman et al. | |
| 2006/0169769 A1 | 8/2006 | Boyarsky et al. | |
| 2007/0255808 A1 | 11/2007 | Kalis | |
| 2008/0086379 A1 | 4/2008 | Dion et al. | |
| 2009/0118849 A1 | 5/2009 | Dery et al. | |
| 2011/0207531 A1* | 8/2011 | Gagner et al. | 463/30 |

* cited by examiner

SYSTEM FOR DIRECT REMOTE ACCESS TO MONEY-OPERATED AMUSEMENT DEVICE

CROSS-REFERENCE TO RELATED APPLICATIONS

This application claims the benefit of U.S. Provisional Patent Application No. 61/300,264, filed on Feb. 1, 2010, entitled "System for Direct Remote Access to Money-Operated Amusement Device," the entire contents of which are incorporated by reference herein.

BACKGROUND OF THE INVENTION

Money operated amusement devices, such as game machines and jukeboxes, typically operate upon input of currency (i.e., coin, token, paper money, credit/debit cards and the like) and are installed in bars, restaurants, airports, shopping malls, video arcades and the like. For game machines, the game choices may include card games, sports games, games of skill, games of chance, action games, trivia games and the like. For jukeboxes, a plurality of songs are generally available for selection and play. Recently, jukeboxes have become computerized, capable of playing selections of music as MP3 files, streaming audio data sets, or the like. The success of operators of money operated amusement devices is generally proportional to the degree of distribution of the devices. Specifically, the greater the degree of distribution of the devices, the greater the overall revenue the operator can expect. Accordingly, money operated amusement devices are distributed over ever increasing, geographical areas.

This growing geographical spread of the distribution of money operated amusement devices presents operators with localization difficulties. Specifically, when service is needed at one of the devices, the service is often related to an issue that is difficult for non-technical staff at the device location to diagnose. Thus, with conventional systems, diagnosis of the issue is only possible when the operator is physically in front of the device, requiring the operator to travel to service the amusement device, and the trip is often distant and time consuming.

However, many of the service issues that arise could be resolved remotely if the amusement device were capable of being accessed and serviced remotely. While there is a class of issues and operations than can be managed using specific applications and protocols, not all issues can be predicted. Thus, it is desirable to provide the operator with the same experience as if in front of the amusement device with all of the amusement device functionality available, thereby reducing travel requirements.

BRIEF SUMMARY OF THE INVENTION

Briefly stated, an embodiment of the present invention is directed to an amusement device communication system for direct remote access to money-operated amusement device which has an amusement device, an internet-based server, and a remote computer. The amusement device has a memory, a display and a controller. The controller is operatively coupled to the memory, the input device and the display. The memory stores at least one electronic game and a system control program. The controller controls the display based upon the system control program retrieved from the memory and based upon inputs from the input device. The internet-based server is in communication with the at least one amusement device through the internet. The remote computer is configured to access the at least one amusement device through a secured-communication connection through the internet-based server to allow access and control of the at least one amusement device by the remote computer.

A further embodiment relates to a method of communicating with an amusement device via a remote computer device. The method comprises the step of providing a communications system comprising at least one amusement device having a controller, a diagnostics server in communication with the amusement device through the internet, an internet-based server in communication with the amusement device and the diagnostics server through the internet, a browser application running on the internet-based server and in communication with the diagnostics server and the amusement device, and at least one remote computer device in communication with the internet and configured to access the amusement device. The method further comprises the steps of accessing the browser application from the remote computer device, the internet-based server instructing the diagnostics server to communicate with the amusement device, the diagnostics server issuing at least one diagnostic command to the amusement device to assess the availability of the amusement device, the diagnostics server issuing a command to the available amusement device to open a virtual private network, the internet-based server using secure shell services and requesting the amusement device to allow establishment of a virtual network connection, the browser application presenting a real-time remote view of the amusement device on the remote computer device, and controlling the amusement device from the remote computer device.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
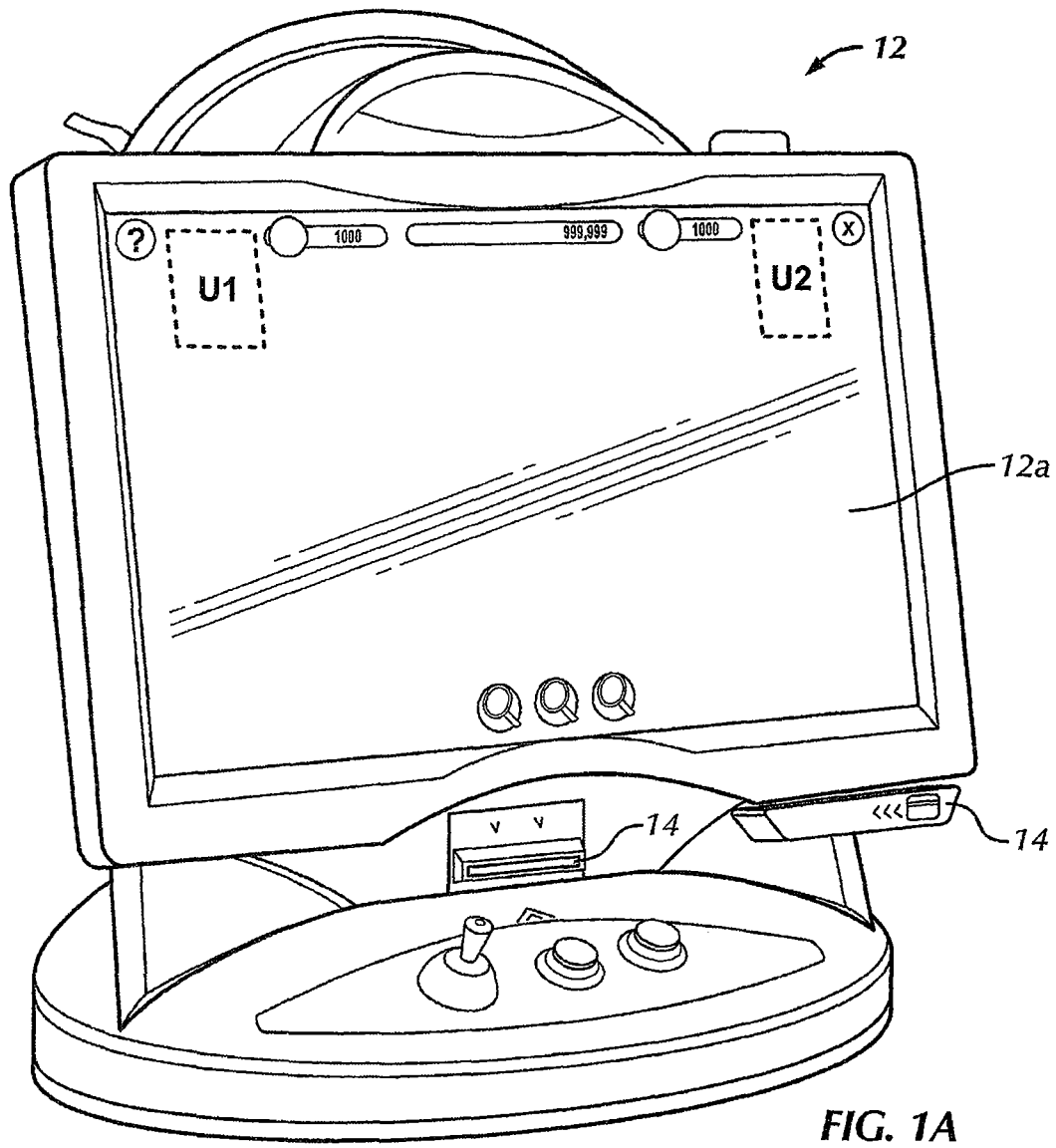
FIG. 1A is a perspective view of an amusement device in accordance with a first preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the apparatus and designated parts thereof. The terminology includes the above-listed words, derivatives thereof, and words of similar import. Additionally, the words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

Figure 2:
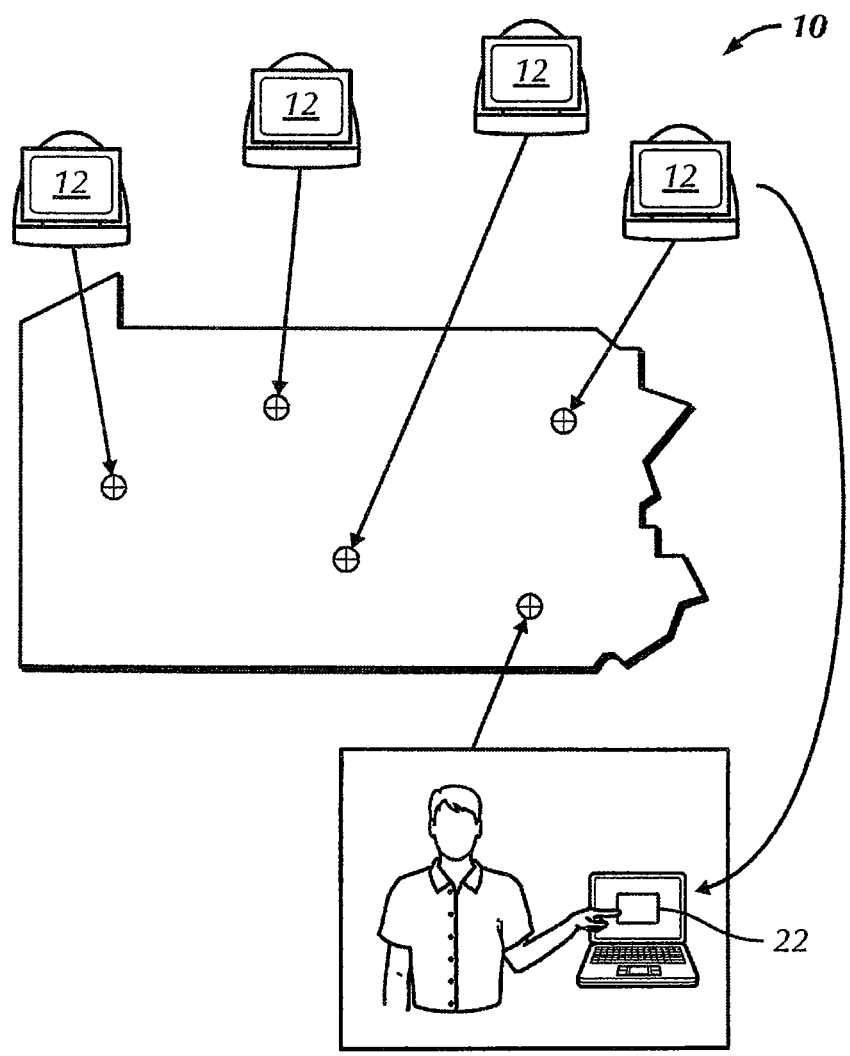
FIG. 2 is a block diagram of a single operator scenario for part of the system according to the presently claimed invention.
Figure 5:
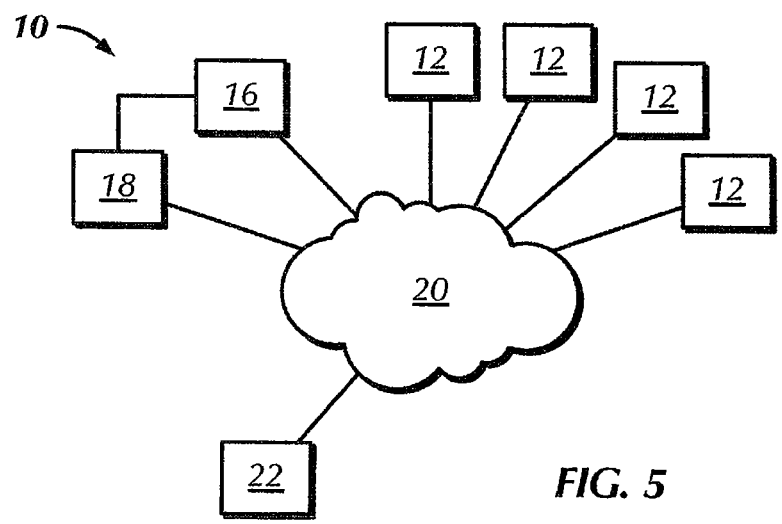
FIG. 5 is a block diagram of a single operator scenario of the system according to the presently claimed invention.

In the drawings, like numerals are used to indicate like elements throughout. Referring to the drawings in detail, FIGS. 2 and 5 show a preferred embodiment of an amusement device remote access and monitoring system 10. While FIGS. 2 and 5 show a single operator having several money operated amusement devices distributed across a wide geographic region, it will be understood by those skilled in the art that the system 10 is designed so that many operators can simultaneously use the system 10, regardless of the geographical location of the operator and the geographical location of corresponding money operated amusement devices.

The system 10 includes a first amusement device 12 and, more preferably, a plurality of amusement devices 12. Each amusement device 12 includes a controller U1 and a memory U2. The memory U2 can be any known or suitable memory device such as random access memory (RAM), read only memory (ROM), flash RAM, hard disk, optical disk, or the like. The amusement device 12 further includes a video display 12a that is operatively connected to the controller U1. Preferably, the display 12a is a touch input mechanism.

The amusement device 12 also includes at least one input component 14 that receives value in order to establish one or more playable credits. The value received may be at least one of currency, coins, tokens, chits, credits, credit cards/debit cards, or the like. Although only one input component 14 is shown, the amusement device 12 may include more than one input component 14 to give a user an option for payment, for permitting multiple players, or the like. Preferably, the amusement device 12 is made operable upon payment by a user, for example, by actuation of the input component 14. In other words, the user may not operate the amusement device 12 or select and play an electronic game or song until value is received at the input component 14 and/or one or more playable credits are issued to the user. However, free selections may be offered at the discretion of an operator of the amusement device 12.

Figure 1B:
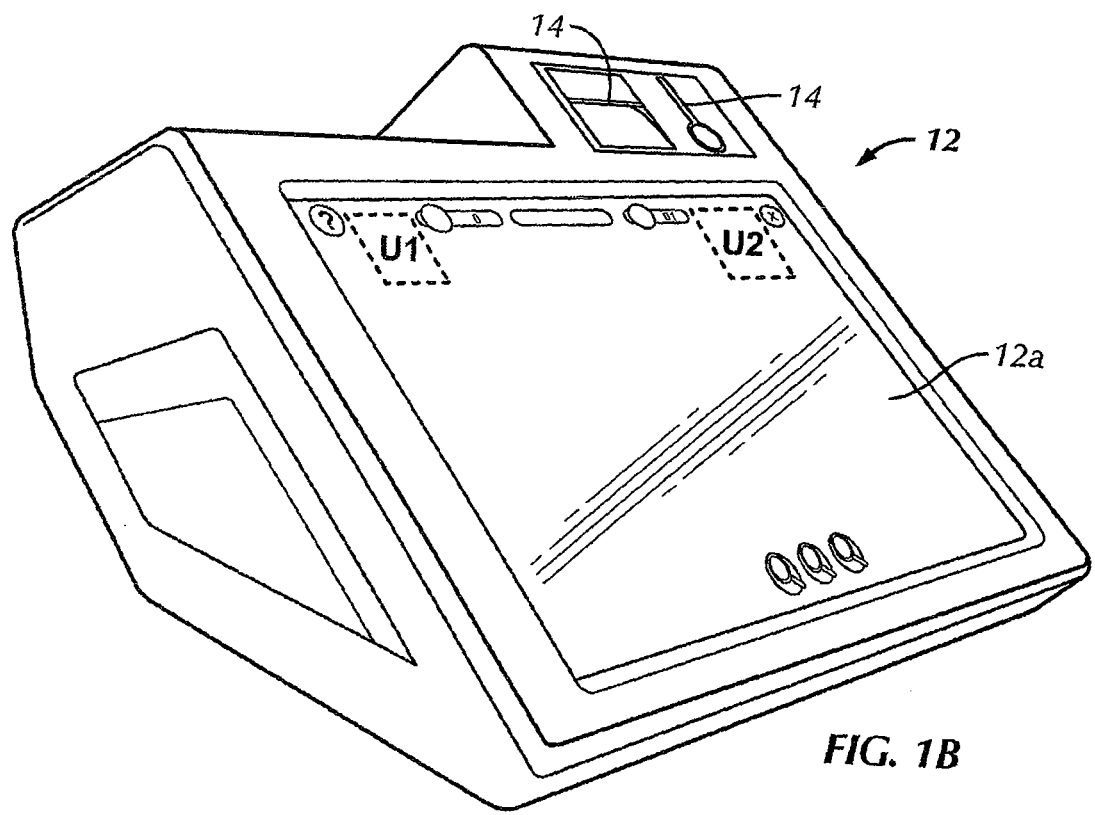
FIG. 1B is a perspective view of an amusement device in accordance with a second preferred embodiment of the present invention.
Figure 1C:
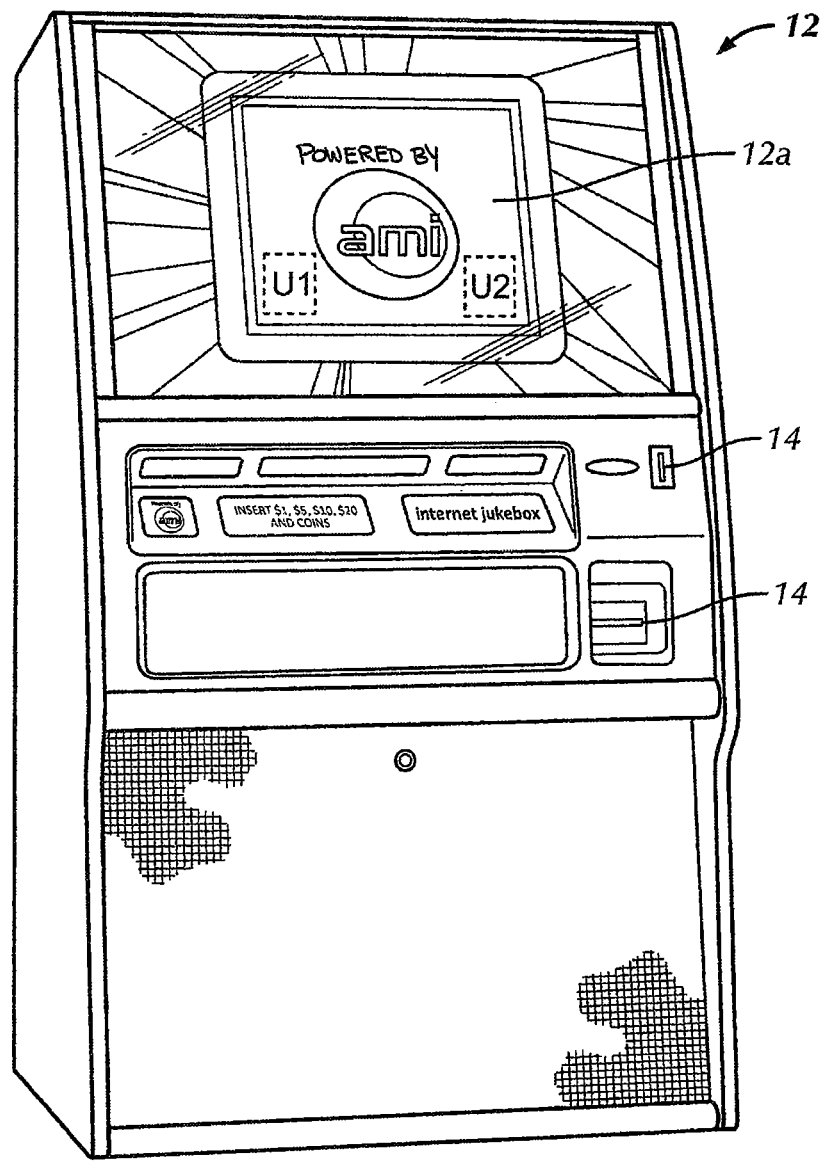
FIG. 1C is a perspective view of an amusement device in accordance with a third preferred embodiment of the present invention.

The amusement devices 12 may be free-standing or floor-standing apparatuses (as shown in FIGS. 1B and 1C), a table-top or counter-top apparatus (as shown in FIG. 1A), or a portable apparatus (not shown). The amusement devices 12 may be arranged in any configuration including table mount, wall mount, pole mount, portable, and the like without departing from the invention.

Each amusement device 12 also includes a communications component 13, such as an Ethernet port, a wireless transceiver, an infrared (IR) port, or the like. Using the communications component 13, the amusement device 12 may communicate with other devices or file servers, access the Internet, communicate over wide area networks (WANs) or local area networks (LANs), or the like. Each amusement device 12 provides for remote or local access for service purposes.

The system 10 further includes a diagnostics server 16, a server 18, a network 20 and an operator terminal 22. It will be understood by those skilled in the art that the system 10 may alternatively include multiple servers 18. The operator terminal 22 is generally a computer device, such as a desktop, laptop, notebook computer, portable data accessory (PDA), or the like. The system 10 is preferably a browser-based system, such that the system 10 is not vulnerable to or dependent upon application codes or other idiosyncracies present or installed on each individual operator terminal 22. Alternatively, the system 10 may be a PDA type system or may utilize custom control hardware, such as a dedicated device. Any appropriate application of sufficient computing power may be utilized for the system 10.

The diagnostics server 16, the server 18, and the network 20 are operatively connected to and in communication with each amusement device 12. Specifically, the amusement devices 12, the diagnostics server 16, the server 18 and the operator terminal 22 are all connected to the network 20 and are thus communicable with each other via the network 20. Alternatively, the diagnostics server 16 and the server 18 may be directly connected to each other. The amusement devices 12 may be connected to the network 20 through conventional communication configurations, such as a LAN, WAN, or the like. Preferably, the amusement devices 12 connect to the network 20 via the Internet. The diagnostics server 16 is always in communication with the amusement devices 12, and the amusement devices 12 only connect back to the network 20 depending upon the activity that is requested of them. The network 20 is a collection of servers, switches, and other communications equipment that provides a variety of services to the amusement devices 12. The server 18 hosts a browser application 24 that connects to the network 20 and provides for remote viewing and control of the amusement devices 12 by the operator.

When the amusement device 12 is placed in a physical geographic location, the operator configures the device 12 to connect to the Internet. The operator also adds the amusement device 12 to the list of amusement devices 12 owned by the operator, such a list preferably being stored on the server 18. Operators are generally only authorized to view, access and control amusement devices 12 which they own.

Upon connection to the Internet, the amusement device 12 preferably automatically seeks out the diagnostics server 16. The diagnostics server 16 is capable of issuing several diagnostic commands to the amusement devices 12. Specifically, the diagnostics server 16 provides point-to-point general diagnostics communication with each amusement device 12 that is connected to the Internet. One may use the diagnostics communication mechanism provided by the diagnostics server 16 for specific diagnostic tasks, such as monitoring of the amusement device's fan speed, temperature, activity, and the like. The diagnostic communication mechanism of the diagnostics server 16 allows monitoring of several operations that can affect the ability of the amusement device 12 to perform its regular and daily functions. The operator is notified of any interruptions or problems with the functionality of the amusement device 12 via alerts by, for example, electronic mail, cellular texting, or the like. This is particularly beneficial for certain amusement devices 12 which are situated in locations, such as bars, in which the devices 12 are relatively more vulnerable to damage.

The diagnostics server 16 cooperates with a wide variety of Internet network configurations and, therefore, results in minimal communication issues related to firewalls and other communication filters during set-up and installation of the system 10 and, more particularly, of the amusement devices 12. Specifically, the operations available via the diagnostics server 16 are limited, and thus provide a relatively high degree of security of the amusement devices 12 from hackers and other malicious network-based activities.

Figure 3:
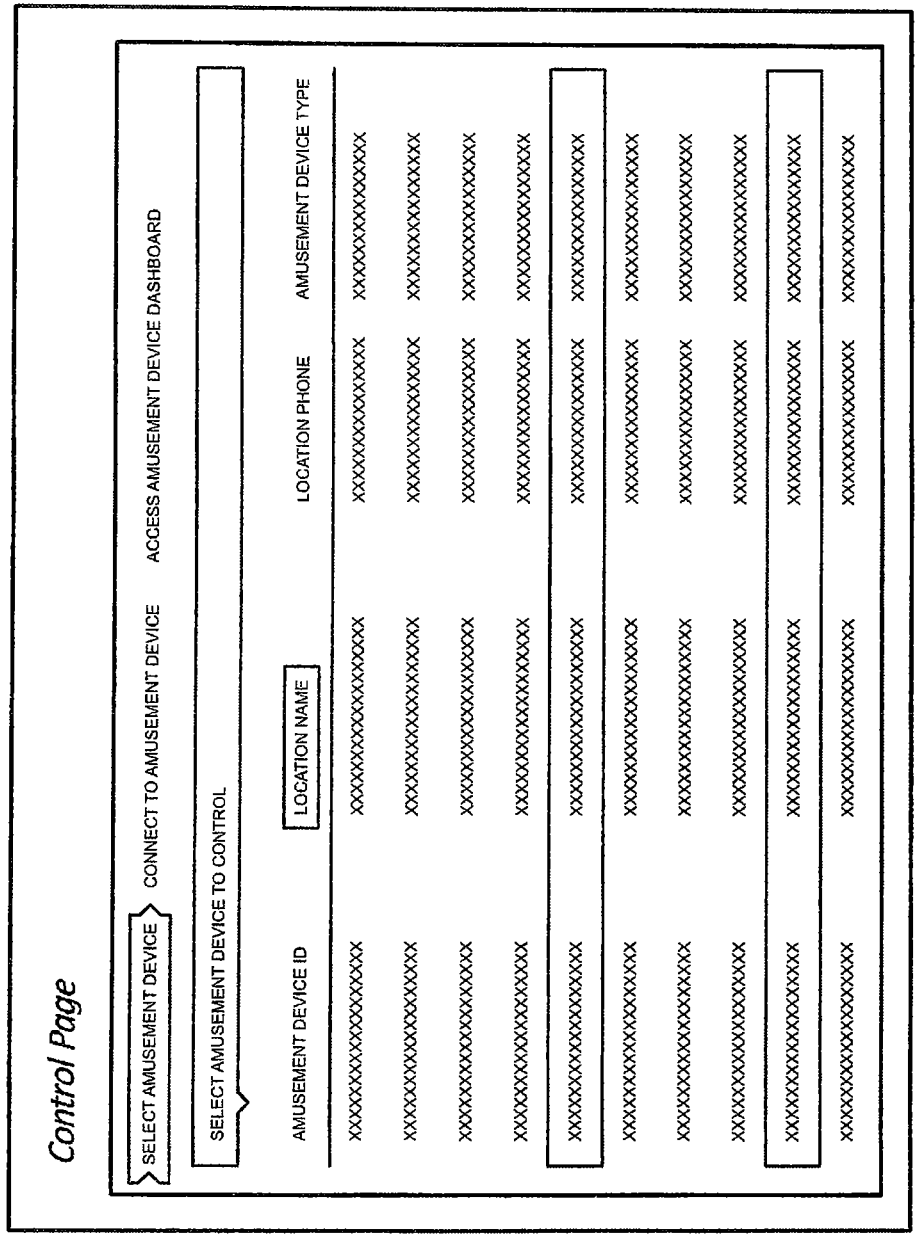
FIG. 3 is a screenshot presenting a list of devices owned by a logged-in operator.

The amusement devices 12 include access and security protocols that provide for secure and remote access and control of the devices 12. Accordingly, the system 10 allows the operator to access and control the amusement device 12, which is at a geographic location remote from the operator. Initially, when the operator is at an operator terminal 22, the operator may use an Internet browser to navigate to the browser application 24 hosted on the server 18 in order to log in to a personal account. The browser application 24 provides an interface between the operator terminal 22 and the amusement device 12. The browser application 24 runs on the server 18 and communicates with the diagnostics server 16 and the amusement devices 12. Once the operator's log-in information and credentials have been authenticated, the operator is directed to a page, via the browser application 24, which presents a list of the amusement devices 12 owned by the operator (see FIG. 3). The "selection" page, a screenshot of which is shown in FIG. 3, reflects various identification information regarding each device 12 owned by the logged-in operator, such as each amusement device's identifier number, a physical location address, a location phone number, and the like. Once the operator selects an amusement device 12 from the list, actions are automatically initiated to achieve a secure remote connection to the selected amusement device 12, as described in detail below.

First, the server 18 instructs the diagnostics server 16 to send trigger commands to the amusement device 12 to initiate the connection process. The diagnostics server 16, in turn, sends diagnostic commands to the selected amusement device 12 to determine if the amusement device 12 is currently accessible. Such diagnostic commands preferably include a ping and a query. Specifically, a ping is sent by the diagnostics server 16 to the amusement device 12 to ensure that the network connection of the amusement device 12 is working properly. The diagnostics server 16 also sends a query to the amusement device 12 to ensure that the amusement device 12 is currently not in use by a customer. By the query command, the system 10 ensures that the operator does not interrupt a customer who has already input some form of currency into the amusement device 12 for playing of a game, song or the like.

Accordingly, after the operator has ensured that the amusement device 12 is currently accessible and not in use, the server 18 instructs the diagnostics server 16 to issue a diagnostics command to the amusement device 12 to open a virtual private network (VPN) back to the network 20. The VPN mechanism is a security mechanism that ensures that unauthorized individuals cannot access the amusement device 12. Once the VPN communications session is established by the amusement device 12, the amusement device 12 virtually appears to the operator as if it were within the network 20, instead of at a remote geographic location. To ensure that a plurality of operators can simultaneously utilize the limited number of connections available, a random transmission control protocol (TCP) port is generated, once the VPN is established, and allows completion of a point-to-point connection between the amusement devices 12 and the network 20. A system 10 may have, for example, upwards of 90,000 amusement devices 12 and 2,000 operators and such a large number of machines cannot operate via a standard VPN connection. As a result, the TCP port mechanism multiplexes the limited number of actual network resources. A connection process is initiated which uses the random TCP port and creates a series of firewall rules to provide the random TCP port available for a limited amount of time. This step minimizes the risk of access to the amusement devices 12, in the event that some unforeseen access failure occurs during the connection process, thereby leaving the amusement device 12 in a partially-connected state.

Once the VPN is running, the server 18 preferably uses secure shell services (SSH) to request the amusement device 12 to allow a virtual network connection (VNC) to be established. The VNC is a communication protocol that works with the graphical user interface (GUI) of the amusement device 12. Preferably, the GUI is the industry standard X11 GUI. However, it will be understood by those skilled in the art that any appropriate interface may be used. The X11 GUI manages the input devices, the display 12*a*, and the like. More specifically, the X11 GUI provides access to the graphics being displayed on the display 12*a* of the amusement device 12, as well as the user touch input mechanism.

The VNC runs on the amusement device 12 and, thus, the amusement device 12 is configured as a VNC server. The browser application 24, which receives data that is pushed back by the amusement device 12, is a VNC viewer component. It is at the GUI-VNC level of the connection process that the operator's ability to access to access, view and control the remote amusement device 12 is established.

Specifically, once the VNC session is established, the browser application 24 presents a control page on the operator's browser (see FIG. 4) on which the operator is provided with a remote view of the selected amusement device 12. Specifically, at this point, the operator is able to observe the display 12*a* of the amusement device 12 in real time and is able to perform the same actions on the amusement device 12 as if physically in front of the device 12. For example, the operator may use a component, such as a mouse or keypad, at the operator terminal 22 to perform the same actions as touching the display 12*a*. Thus, the operator has a live view of the display 12*a* and is virtually present at the amusement device 12.

Once the remote secure connection is established, the system 10 preferably ensures that the touch input mechanism is essentially short-circuited, such that any touches on the display 12*a* at the physical location of the amusement device 12 are ignored. Accordingly, the operator can service the geographically remote amusement device 12 without being interrupted by a customer at the geographic location of the amusement device 12. It will be understood by those skilled in the art that while FIGS. 2 and 5 provide an overview of a single operator scenario, the same functionality of the system 10 is available simultaneously to all operators and all corresponding amusement devices 12. Accordingly, the system 10 operates for a plurality of operators owning a plurality of amusement devices 12.

Figure 4:
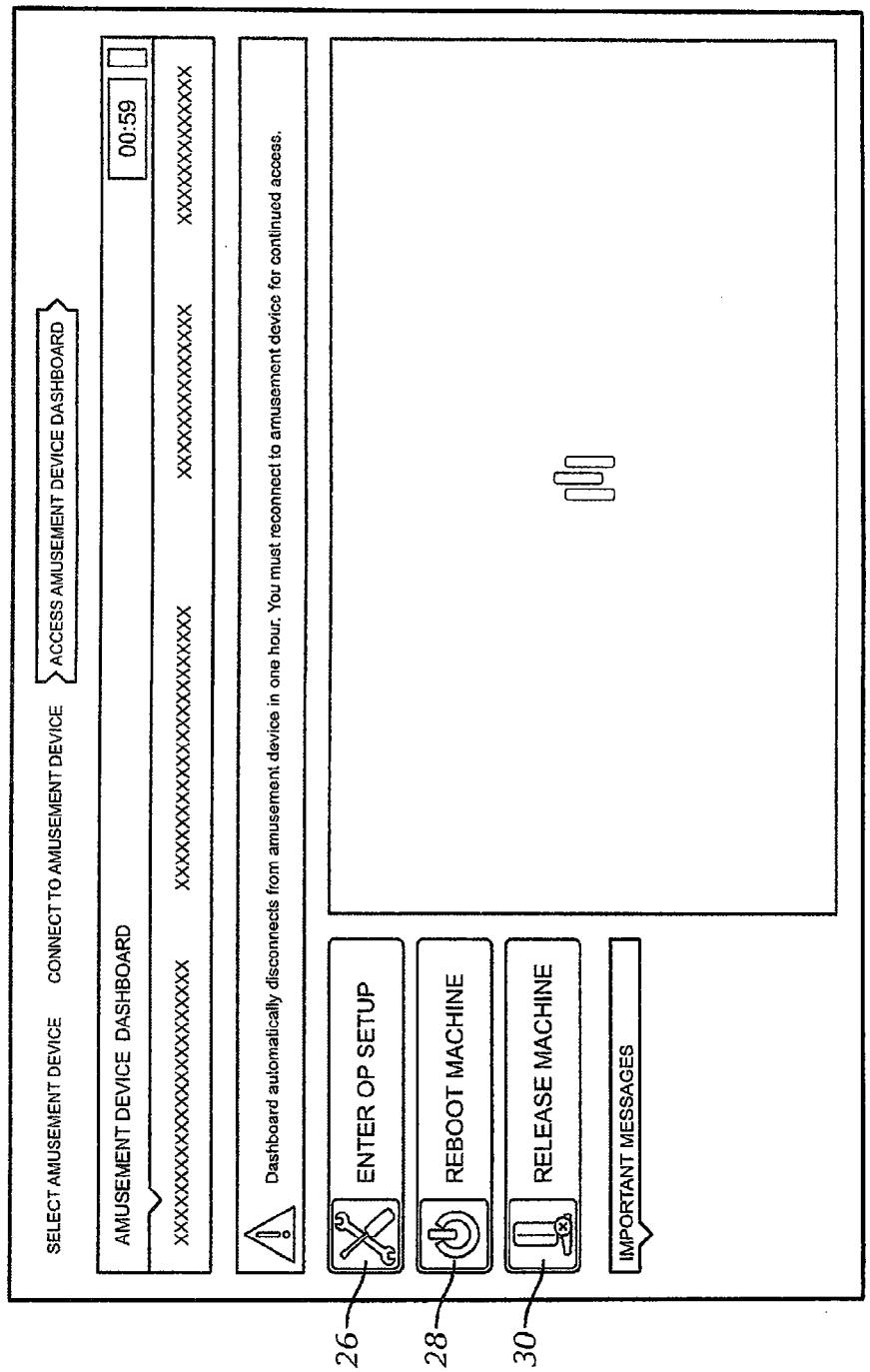
FIG. 4 is a screenshot presenting a real-time view of a selected device from the operator's remote terminal.

On the control page, a screenshot of which is shown at FIG. 4, the operator has a remote view of the display 12*a* of the remote amusement device 12, as well as a view of the external controls that provide functional control of the amusement device 12 that are not otherwise available through the remote and live view of the display 12*a* of the amusement device 12. Preferably, as shown in FIG. 4, the external controls are provided on the left-hand side of the screen of the operator terminal 22, while the remote view of the display 12*a* is provided at the right-hand side of the screen. However, it will be understood by those skilled in the art than an opposite configuration may be employed.

The external controls are preferably a plurality of virtual buttons which provide the operator with the ability to virtually press real buttons that are on the amusement device 12. The external controls involve direct commands being sent from the server 18 to the amusement device 12. The virtual buttons include, for example, a Setup button 26 and a Reboot button 28. The actual Setup button is typically located on each amusement device 12 behind a locked panel on the device 12 because control of the Setup button can impact financial activities of the amusement device 12, such as how much currency or coins should be in the amusement device 12. Accordingly, even at the geographic location of the amusement device 12, unauthorized users cannot access any Setup functions.

When the operator selects the virtual Setup button 26, the server 18 directly sends a setup command to the amusement device 12. Preferably, the server 18 uses SSH to send a proprietary interprocessor command (IPC) to the amusement device 12 to put the amusement device 12 into a Setup mode. The IPC command simulates actual depression of the Setup button physically located on the amusement device 12. Once the amusement device 12 enters the Setup mode, the operator is taken back to the control page via the browser application 24, such that the operator has a real time and remote view of the display 12a of the amusement device 12, just as if the operator were physically present at the geographic location of the device 12.

The Reboot button 28 provides the operator with a power cycling, or restart, functionality for the amusement device 12. When the operator selects the virtual Reboot button 28, the server 18 uses SSH and sends a direct command to the amusement device 12 to initiate shutdown and reboot procedures. While the amusement device 12 is rebooting or restarting, internet connectivity is lost, which causes the firewall rules to be rescinded and ceases the operator's temporary remote access to the amusement device 12. Because the system 10 knows the state of the communications among the various components thereof, the system 10 can automatically reinstate the VNC session. The operator does not have to go through the steps to re-establish the connection. Instead, once the reboot is complete, the diagnostics server 18 automatically requests the amusement device 12 to allow a VNC to be established. Once the connection is established, the operator is taken back to the control page via the browser application 24, such that the operator has a real time and remote view of the display 12a of the amusement device 12, just as if the operator were physically present at the geographic location of the device 12.

The external controls also include a virtual Release Connection button 30. While the operator is remotely connected to and servicing the amusement device 12, it is generally desirable to prevent individuals at the physical geographic location of the amusement device 12 from having any control over the amusement device 12. Thus, normal operation of the system 10 essentially locks out and precludes any local control of the amusement device 12. The virtual Release Connection button 30 allows the operator to end the remote control session and allow local control of the amusement device 12. Specifically, when the operator selects the virtual Release Connection button 30, the VNC session is terminated and the firewall rules are rescinded, thereby ceasing the operator's temporary remote access session and returning the amusement device 12 to its normal and standard operation.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention.

We claim:

1. An amusement device communication system for direct remote access to a money-operated amusement device, the system comprising:

at least one amusement device having a memory, a display and a controller, the controller being operatively coupled to the memory, the input device and the display, the memory storing at least one electronic game and a system control program, the controller controlling the display based upon the system control program retrieved from the memory and based upon inputs from the input device;

an internet-based server in communication with the amusement device through the internet;

at least one remote computer device in communication with at least the internet-based server, the at least one remote computer device being configured to access the at least one amusement device through a secured-communication connection through the internet-based server to allow access and control of at least one of a system operation, system functionality and set up of the amusement device for remote operative control of the amusement device by the remote computer device; and a diagnostics server in communication with at least the at least one amusement device and the internet-based server, the diagnostics server configured to query an amusement device of the at least one amusement device to determine whether the amusement device is in use by a customer and, responsive to a determination that the amusement device is not in use by a customer, issue a diagnostic command to the amusement device to open a secured-communication connection through the internet-based server to allow access and control of at least one of a system operation, system functionality and set up of the amusement device for remote operative control of the amusement device by the remote computer device.

2. The amusement device communication system according to claim 1 further comprising a plurality of amusement devices, wherein the remote computer device is configured to access each of the plurality of amusement devices.

3. The amusement device communication system according to claim 1, wherein the diagnostics server, the amusement device, the internet-based server and the remote computer device are in communication with each other via a network.

4. The amusement device communication system according to claim 1, wherein the diagnostics server and the internet-based server are directly connected to each other.

5. The amusement device communication system according to claim 1, wherein the diagnostics server is configured to issue diagnostic commands to the amusement device for monitoring of a plurality of operations of the amusement device.

6. The amusement device communication system according to claim 1, further comprising a browser application hosted on the internet-based server, the browser application providing an interface between the remote computer device and the amusement device.

7. The amusement device communication system according to claim 1, wherein the operative control includes at least one of setup of the amusement device and rebooting of the amusement device.

8. An amusement device communication system for direct remote access to a money-operated amusement device, the system comprising:

at least one amusement device having a memory, a display and a controller, the controller being operatively coupled to the memory, the input device and the display, the memory storing at least one electronic game and a system control program, the controller controlling the display based upon the system control program retrieved from the memory and based upon inputs from the input device;

an internet-based server in communication with the amusement device through the internet;

at least one remote computer device in communication with at least the Internet-based server, the remote computer device being configured to access the at least one amusement device through a secured-communication connection through the internet-based server to:

(i) allow access and control of at least one of a system operation, system functionality and set up of the amusement device for remote operative control of the amusement device by the remote computer device, and (ii) provide a user of the remote computer device with a remote view of the display of the amusement device; and a diagnostics server in communication with at least the at least one amusement device and the internet-based server, the diagnostics server configured to query an amusement device of the at least one amusement device to determine whether the amusement device is in use by a customer and, responsive to a determination that the amusement device is not in use by a customer, issue a diagnostic command to the amusement device to open the secured-communication connection through the internet-based server.

9. The amusement device communication system according to claim 8, wherein the at least one remote computer device is configured to display one or more virtual control buttons which correspond to one or more physical control buttons provided on the amusement device.

10. The amusement device communication system according to claim 9, wherein the virtual control buttons include at least one of a Setup button, a Reboot button and a Release Connection button.

11. The amusement device communication system according to claim 8, wherein the at least one remote computer device is configured to provide the user of the remote computer device with a remote and real-time view of the display of the amusement device.

12. The amusement device communication system according to claim 8, wherein the operative control includes at least one of setup of the amusement device and rebooting of the amusement device.

* * * * *